(12) United States Patent
Wantland et al.

(10) Patent No.: US 12,524,897 B2
(45) Date of Patent: Jan. 13, 2026

(54) DEPTH-AWARE PHOTO EDITING

(71) Applicant: Google LLC, Mountain View, CA (US)

(72) Inventors: Tim Phillip Wantland, San Francisco, CA (US); Brandon Charles Barbello, Mountain View, CA (US); Christopher Max Breithaupt, Mountain View, CA (US); Michael John Schoenberg, Mountain View, CA (US); Adarsh Prakash Murthy Kowdle, Mountain View, CA (US); Bryan Woods, Mountain View, CA (US); Anshuman Kumar, Mountain View, CA (US)

(73) Assignee: Google LLC, Mountain View, CA (US)

( * ) Notice: Subject to any disclaimer, the term of this patent is extended or adjusted under 35 U.S.C. 154(b) by 269 days.

(21) Appl. No.: 18/224,801

(22) Filed: Jul. 21, 2023

(65) Prior Publication Data

US 2023/0377183 A1    Nov. 23, 2023

Related U.S. Application Data

(63) Continuation of application No. 17/344,256, filed on Jun. 10, 2021, now Pat. No. 11,756,223, which is a
(Continued)

(51) Int. Cl.
| | |
|---|---|
| *G06T 7/00* | (2017.01) |
| *G06T 7/174* | (2017.01) |
| *G06T 7/593* | (2017.01) |
| *G06T 19/20* | (2011.01) |
| *H04N 13/128* | (2018.01) |
| *H04N 13/00* | (2018.01) |

(52) U.S. Cl.
CPC .............. *G06T 7/593* (2017.01); *G06T 7/174* (2017.01); *G06T 19/20* (2013.01); *H04N 13/128* (2018.05); *H04N 2013/0081* (2013.01)

(58) Field of Classification Search
None
See application file for complete search history.

(56) References Cited

U.S. PATENT DOCUMENTS

| | | |
|---|---|---|
| 8,723,974 B2 | 5/2014 | Suzuki |
| 9,836,831 B1 | 12/2017 | Krishnaswamy et al. |
| (Continued) | | |

FOREIGN PATENT DOCUMENTS

| | | |
|---|---|---|
| EP | 1826723 | 8/2007 |

OTHER PUBLICATIONS

Fan et al., "Collaborative Three-Dimensional Completion of Color and Depth in a Specified Area with Superpixels," IEEE Transactions on Industrial Electronics, Aug. 1, 2019, pp. 6260-6269, vol. 66, No. 8.

(Continued)

*Primary Examiner* — Martin Mushambo
(74) *Attorney, Agent, or Firm* — McDonnell Boehnen Hulbert & Berghoff LLP

(57) ABSTRACT

The methods and systems described herein provide for depth-aware image editing and interactive features. In particular, a computer application may provide image-related features that utilize a combination of a (a) the depth map, and (b) segmentation data to process one or more images, and generate an edited version of the one or more images.

20 Claims, 10 Drawing Sheets

Related U.S. Application Data continuation of application No. 16/720,743, filed on Dec. 19, 2019, now Pat. No. 11,100,664.

(60) Provisional application No. 62/884,772, filed on Aug. 9, 2019.

(56) References Cited

U.S. PATENT DOCUMENTS

| | | | |
|---|---|---|---|
| 10,339,721 B1* | 7/2019 | Dascola | G06F 3/011 |
| 10,540,491 B1* | 1/2020 | Martinez | G06V 40/28 |
| 10,554,957 B2 | 2/2020 | Valentin et al. | |
| 10,803,669 B1* | 10/2020 | Roche | G06F 3/04815 |
| 10,848,335 B1* | 11/2020 | Roche | G06V 20/20 |
| 11,100,664 B2 | 8/2021 | Wantland et al. | |
| 11,417,069 B1* | 8/2022 | Gupta | G06V 20/70 |
| 2009/0185741 A1* | 7/2009 | Nahari | G06V 20/13 382/154 |
| 2010/0182410 A1 | 7/2010 | Verburgh et al. | |
| 2011/0255775 A1 | 10/2011 | Mcnamer et al. | |
| 2014/0267618 A1 | 9/2014 | Esteban et al. | |
| 2015/0091900 A1 | 4/2015 | Yang et al. | |
| 2015/0145966 A1 | 5/2015 | Krieger et al. | |
| 2015/0341604 A1 | 11/2015 | Cote et al. | |
| 2017/0076499 A1* | 3/2017 | Jiang | G06T 7/00 |
| 2017/0091999 A1* | 3/2017 | Blumenfeld | B25J 9/1697 |
| 2017/0243352 A1 | 8/2017 | Kutliroff et al. | |
| 2017/0304732 A1* | 10/2017 | Velic | G06V 10/774 |
| 2017/0374341 A1* | 12/2017 | Michail | G06T 19/00 |
| 2017/0374343 A1* | 12/2017 | Boulton | H04N 13/117 |
| 2018/0046874 A1 | 2/2018 | Guo et al. | |
| 2018/0160105 A1* | 6/2018 | Ross | H04L 51/224 |
| 2018/0176532 A1 | 6/2018 | Gallo et al. | |
| 2018/0246631 A1* | 8/2018 | Maruyama | G06T 19/20 |
| 2018/0300942 A1 | 10/2018 | Eskander et al. | |
| 2019/0035124 A1* | 1/2019 | Kapinos | G06T 11/60 |
| 2019/0080498 A1 | 3/2019 | Horie et al. | |
| 2019/0164322 A1 | 5/2019 | Kong et al. | |
| 2019/0287259 A1 | 9/2019 | Tankovich et al. | |
| 2020/0312015 A1* | 10/2020 | Frommhold | G06T 19/00 |
| 2020/0320726 A1* | 10/2020 | An | G06T 7/55 |
| 2021/0004146 A1* | 1/2021 | Linville | G06F 3/0304 |
| 2021/0005025 A1* | 1/2021 | Marshall | G06T 19/003 |
| 2021/0304379 A1* | 9/2021 | Barlow | G06F 40/30 |

OTHER PUBLICATIONS

Fried et al., "Photo Manipulation, The Easy Way," Preview, ProQuest LLC, Jun. 2017, 24 pages.

He et al., "Object Removal by Depth-Guided Inpainting," Institute for Software Technology and Interactive Systems Interactive and Multimedia Systems Group (IMS), Vienna University of Technology, Jan. 1, 2011, pp. 1-8.

International Searching Authority, International Search Report and Written Opinion mailed Dec. 7, 20202, issued in connection with International Patent Application No. PCT/US2020/042314, 23 pages.

Nielsen et al., "ClickRemoval: Interactive Pinpoint Image Object Removal," Proceedings of the ACM International Conference on Multimedia, Nov. 6, 2005, pp. 315-318.

Portrait by img.ly, https://itunes.apple.com/US/app/portrait-by-img-ly/id1207277088?mt=8, May 10, 2019, 14 pages.

Liu et al., "Stereo-based bokeh effects for photography," Machine Vision and Applications, 2016, pp. 1325-1337, vol. 27.

Lopez-Moreno et al., "Non-photorealistic, depth-based image editing," Computers & Graphics, 2011, pp. 99-111, vol. 35.

Tankovich et al., "SOS: Stereo Matching in O(1) with Slanted Support Windows," 2018 IEEE/RSJ International Conference on Intelligent Robots and Systems (IROS), Madrid, Spain, Oct. 1-5, 2018, pp. 6782-6789.

Yuniarti et al., "Implementation of Reconstruction Filter to Create Motion Blur Effect in Urhho3D Game Engine," 2018 International Conference on Computer Engineering, Network and Intelligent Multimedia (CENIM), 2018, pp. 198-203.

* cited by examiner

DEPTH-AWARE PHOTO EDITING

CROSS REFERENCE TO RELATED APPLICATIONS

This application is a continuation of U.S. Ser. No. 17/344,256, filed Jun. 10, 2022, which is a continuation of U.S. Ser. No. 16/720,743 filed Dec. 19, 2019, and published as U.S. Patent Publication No. 2021/004,2950, and claims priority to U.S. Provisional Application Ser. No. 62/884,772 filed Aug. 9, 2019, the contents of which are incorporated by reference herein.

BACKGROUND

Many modern computing devices, including mobile phones, personal computers, and tablets, include image capture devices, such as still and/or video cameras. The image capture devices can capture images, such as images that include people, animals, landscapes, and/or objects.

Some image capture devices and/or computing devices can correct or otherwise modify captured images. For example, some image capture devices can provide "red-eye" correction that removes artifacts such as red-appearing eyes of people and animals that may be present in images captured using bright lights, such as flash lighting. After a captured image has been corrected, the corrected image can be saved, displayed, transmitted, printed to paper, and/or otherwise utilized.

SUMMARY

In one aspect, a computer-implemented method is provided. The method involves a computing device: (i) receiving, at a computing device, image data for a first image, (ii) determining a depth map for the first image, (iii) determining segmentation data for the first image, and (iv) based at least in part on (a) the depth map, and (b) the segmentation data, processing the first image to generate an edited version of the first image.

In another aspect, a computing device includes one or more processors and data storage having computer-executable instructions stored thereon. When executed by the one or more processors, instructions cause the computing device to carry out functions comprising: (i) receiving image data for a first image, (ii) determining a depth map for the first image, (iii) determining segmentation data for the first image, and (iv) based at least in part on (a) the depth map, and (b) the segmentation data, processing the first image to generate an edited version of the first image.

In a further aspect, a system includes: (i) means for receiving, at a computing device, image data for a first image, (ii) means for determining a depth map for the first image, (iii) means for determining segmentation data for the first image, and (iv) means for, based at least in part on (a) the depth map, and (b) the segmentation data, processing the first image to generate an edited version of the first image.

In another aspect, an example computer readable medium comprises program instructions that are executable by a processor to perform functions comprising: (i) receiving, at a computing device, image data for a first image, (ii) determining a depth map for the first image, (iii) determining segmentation data for the first image, and (iv) based at least in part on (a) the depth map, and (b) the segmentation data, processing the first image to generate an edited version of the first image.

The foregoing summary is illustrative only and is not intended to be in any way limiting. In addition to the illustrative aspects, embodiments, and features described above, further aspects, embodiments, and features will become apparent by reference to the figures and the following detailed description and the accompanying drawings.

DETAILED DESCRIPTION

Figure 1:
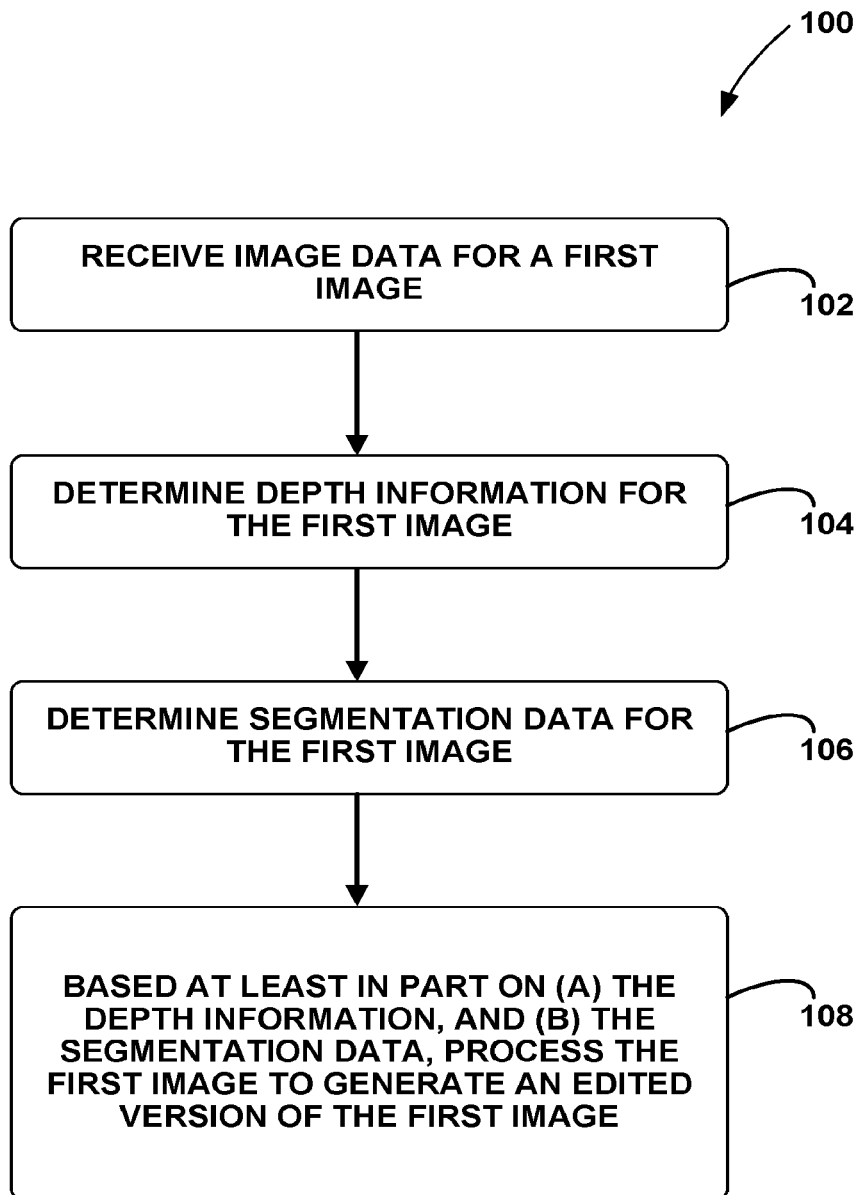
FIG. 1 is a flow chart illustrating a computer-implemented method for depth-aware image processing, according to example embodiments.

This application describes methods and systems for utilizing image segmentation in combination with depth map data to provide for various types of depth-aware photo editing. The depth-aware photo editing may be applied in image post-processing, or in real-time (e.g., in a live-view viewfinder for a camera application).

I. SEGMENTATION OF IMAGES

Example embodiments may utilize segmentation data for an image to perform various types of image processing on the image. In particular, example embodiments may utilize object segmentation data, such as segmentation masks that outline, isolate, or separate a person or other object(s) of interest within an image; e.g., by indicating an area or areas of the image occupied by a foreground object or objects in a scene, and an area or areas of the image corresponding to the scene's background.

Masks are often used in image processing and can involve setting the pixel values within an image to zero or some other background value. For instance, a mask image can correspond to an image where some of the pixel intensity values are zero, and other pixel values are non-zero (e.g., a binary mask that uses "1's" and "0's"). Wherever the pixel intensity value is zero in the mask image, then the pixel intensity of the resulting masked image can be set to the background value (e.g., zero). To further illustrate, an example mask may involve setting all pixels that correspond to an object in the foreground of an image to white and all pixels that correspond to background features or objects to black. Prediction masks can correspond to estimated segmentations of an image (or other estimated outputs) produced by a convolutional neural network (CNN). The prediction masks can be compared to a ground truth mask, which can represent the desired segmentation of the input image.

In embodiments, image segmentation masks may be generated or provided by a process that utilizes machine learning. For instance, a CNN may be trained and subsequently utilized to solve a semantic segmentation task. The specific segmentation task may be to a binary or multi-level prediction mask that separates objects in the foreground of an image from a background area or areas in an image. Prediction masks can correspond to estimated segmentations of an image (or other estimated outputs) produced by a CNN.

In some embodiments, a CNN may be utilized to estimate image or video segmentation masks in real-time, such that segmentation can be performed for video (e.g., at 30 frames per second), as well as for still images. To do so, each image in a sequence of images may be separated into its three color channels (RGB), and these three color channels may then be concatenated with a mask for a previous image in the sequence. This concatenated frame may then be provided as input to the CNN, which outputs a mask for the current image.

More specifically, in some embodiments, each color channel of each pixel in an image patch is a separate initial input value. Assuming three color channels per pixel (e.g., red, green, and blue), even a small 32×32 patch of pixels will result in 3072 incoming weights for each node in the first hidden layer. This CNN architecture can be thought of as three dimensional, with nodes arranged in a block with a width, a height, and a depth. For example, the aforementioned 32×32 patch of pixels with 3 color channels may be arranged into an input layer with a width of 32 nodes, a height of 32 nodes, and a depth of 3 nodes.

When utilizing a CNN where the input image data relies on the mask from the previous image frame in a sequence, an example CNN can provide frame-to-frame temporal continuity, while also accounting for temporal discontinuities (e.g., a person or a pet appearing in the camera's field of view unexpectedly). The CNN may have been trained through transformations of the annotated ground truth for each training image to work properly for the first frame (or for a single still image), and/or when new objects appear in a scene. Further, affine transformed ground truth masks may be utilized, with minor transformations training the CNN to propagate and adjust to the previous frame mask, and major transformations training the network to understand inadequate masks and discard them.

II. GENERATING DEPTH INFORMATION FOR IMAGES

The depth information can take various forms. For example, the depth information could be a depth map, which is a coordinate mapping or another data structure that stores information relating to the distance of the surfaces of objects in a scene from a certain viewpoint (e.g., from a camera or mobile device). For instance, a depth map for an image captured by a camera can specify information relating to the distance from the camera to surfaces of objects captured in the image; e.g., on a pixel-by-pixel (or other) basis or a subset or sampling of pixels in the image.

As one example, the depth map can include a depth value for each pixel in an image, where the depth value DV1 of depth map DM for pixel PIX of image IM represents a distance from the viewpoint to one or more objects depicted by pixel PIX in image IM. As another example, image IM can be divided into regions (e.g., blocks of N×M pixels where N and M are positive integers) and the depth map can include a depth value for each region of pixels in the image; e.g., a depth value DV2 of depth map DM for pixel region PIXR of image IM represents a distance from the viewpoint to one or more objects depicted by pixel region PIXR in image IM. Other depth maps and correspondences between pixels of images and depth values of depth maps are possible as well; e.g., one depth value in a depth map for each dual pixel of a dual pixel image.

Various techniques may be used to generate depth information for an image. In some cases, depth information may be generated for the entire image (e.g., for the entire image frame). In other cases, depth information may only be generated for a certain area or areas in an image. For instance, depth information may only be generated when image segmentation is used to identify one or more objects in an image. Depth information may be determined specifically for the identified object or objects.

In embodiments, stereo imaging may be utilized to generate a depth map. In such embodiments, a depth map may be obtained by correlating left and right stereoscopic images to match pixels between the stereoscopic images. The pixels may be matched by determining which pixels are the most similar between the left and right images. Pixels correlated between the left and right stereoscopic images may then be used to determine depth information. For example, a disparity between the location of the pixel in the left image and the location of the corresponding pixel in the right image may be used to calculate the depth information using binocular disparity techniques. An image may be produced that contains depth information for a scene, such as information related to how deep or how far away objects in the scene are in relation to a camera's viewpoint. Such images are useful in perceptual computing for applications such as gesture tracking and object recognition, for example.

Various depth sensing technologies are used in computer vision tasks including telepresence, 3D scene reconstruction, object recognition, and robotics. These depth sensing technologies include gated or continuous wave time-of-flight (ToF), triangulation-based spatial, temporal structured light (SL), or active stereo systems.

However, efficient estimation of depth from pairs of stereo images is computationally expensive and one of the core problems in computer vision. Multiple memory accesses are often required to retrieve stored image patches from memory. The algorithms are therefore both memory and computationally bound. The computational complexity therefore increases in proportion to the sample size, e.g., the number of pixels in an image.

The efficiency of stereo matching techniques can be improved using active stereo (i.e., stereo matching where scene texture is augmented by an active light projector), at least in part due to improved robustness when compared to time of flight or traditional structured light techniques. Further, relaxing the fronto-parallel assumption, which requires that the disparity be constant for a given image patch, allows for improved stereo reconstruction. Accordingly, some implementations of the systems and methods described herein may utilize a process for determining depth information that divides an image into multiple non-overlapping tiles. Such techniques may allow for exploration of the much-larger cost volume corresponding to disparity-space planes by amortizing compute across these tiles, thereby removing dependency on any explicit window size to compute correlation between left and right image patches in determining stereo correspondence.

For example, in some embodiments, a method of depth estimation from pairs of stereo images includes capturing, at a pair of cameras, a first image and a second image of a scene. The first image and the second image form a stereo pair and each include a plurality of pixels. Each of the plurality of pixels in the second image is initialized with a disparity hypothesis. The method includes recursively determining, from an image tile of a smaller pixel size to an image tile of a larger pixel size, matching costs of the disparity hypothesis for each of the plurality of pixels in the second image to generate an initial tiled disparity map including a plurality of image tiles, wherein each image tile of the initial tiled disparity map is assigned a disparity value estimate. The disparity value estimate of each image tile is refined to include a slant hypothesis. Additionally, the disparity value estimate and slant hypothesis for each tile may be replaced by a better matching disparity-slant estimate from a neighboring tile to incorporate smoothness costs that enforce continuous surfaces. A final disparity estimate (including a slant hypothesis) for each pixel of the second image is determined based on the refined disparity value estimate of each image tile, which is subsequently used to generate a depth map based on the determined final disparity estimates.

In another aspect, depth information can also be generated using data from a single sensor (e.g., image data from a single image sensor), or using data from multiple sensors (e.g., two or more image sensors). In some implementations, image data from a pair of cameras (e.g., stereo imaging) may be utilized to determine depth information for an image from one of the cameras (or for an image that is generated by combining data from both cameras). Depth information can also be generated using data from more than two image sensors (e.g., from three or more cameras).

In a single-camera approach, depth maps can be estimated from images taken by one camera that uses dual pixels on light-detecting sensors; e.g., a camera that provides autofocus functionality. A dual pixel of an image can be thought of as a pixel that has been split into two parts, such as a left pixel and a right pixel. Then, a dual pixel image is an image that includes dual pixels. For example, an image IMAGE1 having R rows and C columns of pixels can be and/or be based on a dual pixel image DPI having R rows and C columns of dual pixels that correspond to the pixels of image IMAGE1.

To capture dual pixels, the camera can use a sensor that captures two slightly different views of a scene. In comparing these two views, a foreground object can appear to be stationary while background objects move vertically in an effect referred to as parallax. For example, a "selfie" or image of a person taken by that person typically has the face of that person as a foreground object and may have other objects in the background. So, in comparing two dual pixel views of the selfie, the face of that person would appear to be stationary while background objects would appear to move vertically.

One approach to compute depth from dual pixel images includes treating one dual pixel image as two different single pixel images, and try to match the two different single pixel images. The depth of each point determines how much it moves between the two views. Hence, depth can be estimated by matching each point in one view with its corresponding point in the other view. This method may be referred to as "depth from stereo." However, finding these correspondences in dual pixel images is extremely challenging because scene points barely move between the views. Depth from stereo can be improved upon based on an observation that the parallax is only one of many depth cues present in images, including semantic, defocus, and perhaps other cues. An example semantic cue is an inference that a relatively-close object takes up more pixels in an image than a relatively-far object. A defocus cue is a cue based on the observation that points that are relatively far from an observer (e.g., a camera) appear less sharp/blurrier than relatively-close points.

In some implementations, machine learning, such as neural networks, may be utilized to predict depth information from dual pixel images and/or from stereo images captured by a camera pair. In particular, dual pixel images and/or stereo image pairs can be provided to a neural network to train the neural network to predict depth maps for the input dual pixel images and/or input stereo image pairs. For example, the neural network can be and/or can include a convolutional neural network. The neural network can take advantage of parallax cues, semantic cues, and perhaps other aspects of dual pixel images to predict depth maps for input dual pixel images.

The neural network can be trained on a relatively-large dataset (e.g., 50,000 or more) of images. The dataset can include multiple photos of an object taken from different viewpoints at substantially the same time to provide ground truth data for training the neural network to predict depth maps from dual pixel images and/or from stereo images. For example, a multi-camera device can be used to obtain multiple photos of an object taken from a plurality of cameras at slightly different angles to provide better ground-truth depth data to train the neural network. In some examples, the multi-camera device can include multiple mobile computing devices, each equipped with a camera that can take dual pixel images or and/or pairs of cameras that can capture stereo images. Then, the resulting dual pixel images and/or stereo images, which are training data for the neural network, are similar to dual pixel images and/or stereo images taken using the same or similar types of cameras on other mobile computing devices; e.g., user's mobile computing devices. Structure from motion and/or multi-view stereo techniques can be used to compute depth maps from the dual pixel images captured by a multi-camera device and/or from stereo image data.

Once the neural network is trained, the trained neural network can receive an image data of a scene, which can include one or more objects therein. The image data may be a dual pixel image or stereo images of the scene. The neural network may then be applied to estimate a depth map for the input image. The depth map can then be provided for use in processing the image data in various ways. Further, in embodiments, the depth information provided by a depth map can be combined with segmentation data for the same image to further improve image processing capabilities of, e.g., a mobile computing device.

The use of machine learning technology as described herein, such as the use of neural networks, can help provide for estimation of depth maps that take into account both traditional depth cues, such as parallax, and additional depth cues, such as, but not limited to semantic cues and defocus cues. However, it should be understood that depth maps and other forms of depth information may be generated using other types of technology and processes that do not rely upon machine learning, and/or utilize different types of machine learning from those described herein.

III. DEPTH-AWARE IMAGE PROCESSING

Embodiments described herein utilize a combination of depth information and image segmentation data to provide various types of photo and/or video editing or processing features. For example, an imaging application may utilize a combination of: (i) segmentation masks, and (ii) depth maps, to provide depth-aware editing and/or real-time depth-aware processing of specific objects or features in a photo or video.

The depth-aware image processing described herein may be implemented in various types of applications, and by various types of computing devices. For example, the depth-aware processes described herein may be implemented by an image editing application, which allows for depth-aware post-processing of still images and/or video. The depth-aware processes described herein could additionally or alternatively be implemented by a camera application or another type of application that includes a live-view interface. A live-view interface typically includes a viewfinder feature, where a video feed of a camera's field of view is displayed in real-time. The video feed for the live-view interface may be generated by applying depth-aware image processing to an image stream (e.g., video) captured by a camera (or possibly to concurrently captured image streams from multiple cameras). The depth-aware processes described herein could additionally or alternatively be implemented by a video conference application, and/or other types of applications.

The depth-aware image processing described herein can be implemented by various types of computing devices. For instance, the depth-aware image processing described herein could be implemented by an application on a mobile computing device, such as a mobile phone, a tablet, a wearable device. The depth-aware image processing described herein could also be implemented by a desktop computer application, and/or by other types of computing devices.

Further, a computing device that implements depth-aware image processing could itself include the camera or cameras that capture the image data being processed. Alternatively, a computing device that implements depth-aware image processing could be communicatively coupled to a camera or camera array, or to another device having a camera or camera array, which captures the image data for depth-aware image processing.

FIG. 1 is a flow chart illustrating a computer-implemented method 100 for depth-aware image processing, according to example embodiments. In particular, method 100 involves a computing device receiving image data for a scene, as shown by block 102. The computing device determines depth information (e.g., a depth map) for the scene, as shown by block 104. The depth information for the scene can be determined based at least in part on the first image. The computing device also determines segmentation data for the first image, as shown by block 106. Then, based at least in part on (a) the depth information, and (b) the segmentation data, the computing device processes the first image to generate an edited version of the first image, as shown by block 108.

Examples of depth-aware image processing that may be implemented at block 108 include selective object removal, selective blurring, the addition of three-dimensional (3D) AR graphic objects and animations, object-specific zoom, generation of interactive image content with parallax visualization (e.g., a "pano-selfie"), bokeh effects in still images, video and real-time "live-view" interfaces, focal length adjustment in post-processing of still images and video, software-based real-time simulation of different focal lengths in a "live-view" interface, and/or the addition of virtual light sources in a real-time "live-view" interface and/or in image post-processing, among other possibilities.

A. Selective Objective Removal and Blurring

In some implementations of method 100, processing the first image may involve applying an object removal process to remove a selected object or objects from the first image. The object removal process may involve removing and replacing (or covering) the selected object. Additionally or alternatively, processing the first image may involve applying a blurring process to blur a selected object or objects in the first image. The blurring process may involve generating a blurred version of the selected object or objects, and replacing the selected object or objects in the first image with the blurred version.

In both cases, segmentation masks that separate one or more objects in an image (e.g., foreground objects) from the remainder of the image can be utilized to identify objects that are selectable by a user. As such, an interface may be provided via which a user can identify and select identified objects. The computing device may receive user input via such interface and/or via other user-interface devices, which includes an object removal instruction and/or a blurring instruction. An object removal instruction can indicate a selection of at least one identified object in the image for removal. The computing device can then apply an object removal process to remove the selected object or objects from the image, and generate replacement image content for the removed object. Similarly, a blurring instruction can indicate a selection of at least one identified object in the image for blurring. The computing device can then apply a blurring process to replace the selected object or objects with a blurred version or versions of the selected object or objects.

In a further aspect, depth information may be utilized to replace or blur a selected object. In particular, depth information may be utilized to generate replacement image content that looks natural and realistic in the context of the image (in an effort to hide the fact that the object has been removed from the viewer). For example, the computing device may use a depth map for an image to determine depth information for at least one area that is adjacent or near to the selected object in the image. The depth information for the at least one adjacent or nearby area can then be used to generate replacement image data. The depth information may allow for more natural looking replacement image content. For example, the depth information for the surrounding areas in the area may be used to more effectively simulate lighting incident on surfaces in the replacement content.

When a blurring effect is applied, the depth information for the selected object may be used in conjunction with depth information for surrounding areas of the image to generate a blurred version of the content that simulates movement of the object during image capture (e.g., simulating an image where portions of the background behind the selected object, and the corresponding portions of the selected object, are both captured while the camera shutter is open). Other examples are also possible.

FIGS. 2A to 2D show a graphic interface for editing an image, where an object removal feature and a blurring feature are provided. In particular, FIGS. 2A to 2D shows a screen from an image editing application where a photo is being edited. In this example, the image editing application is provided via a touchscreen device, such as a mobile phone with a touchscreen.

Figure 2A:
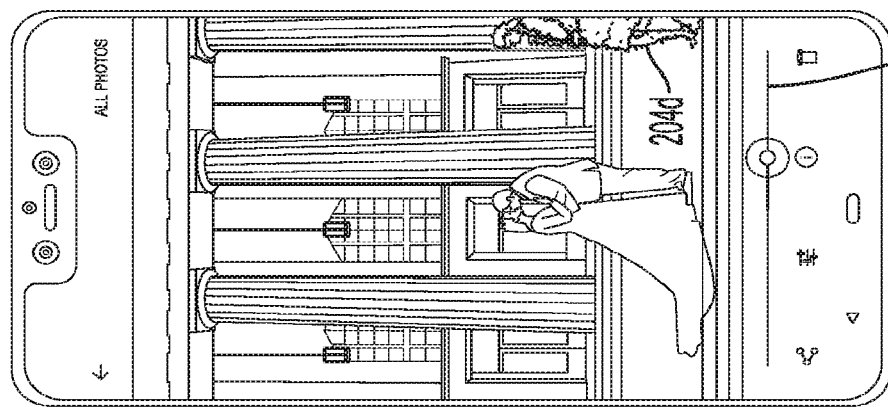
FIGS. 2A to 2D show a graphic interface for editing an image, according to example embodiments.

In FIG. 2A, the editing application displays the original version of the photo. Segmentation masks are provided that identify at least one object in the photo. In particular, a person 204a is identified by the segmentation data. Accordingly, the editing application may allow the user to select person 204a (and possibly other objects) by using the touchscreen to tap on person 204a.

Figure 2B:
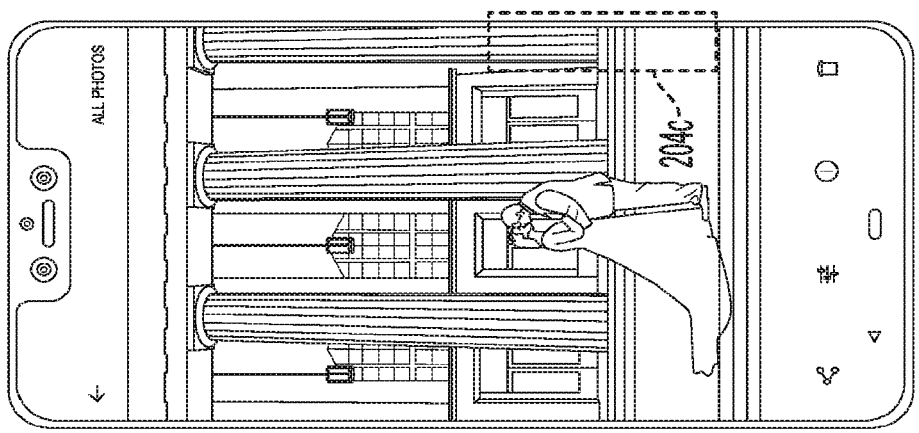

When the user taps on person 204a, the editing application may display a graphic indication that a selection has been made. For instance, when the user taps on or otherwise selects person 204a, the person 204a may be replaced with a semi-transparent mask 204b of the person, as shown in FIG. 2B. As further shown in FIG. 2B, when the user selects person 204a, the editing application may display a user-selectable blur button 206a and a user-selectable remove button 206b. (Note that other types of user-interface elements may be provided to initiate a blurring process and/or object removal, in addition or in the alternative to blur button 206a and/or remove button 206b.)

Figure 2C:
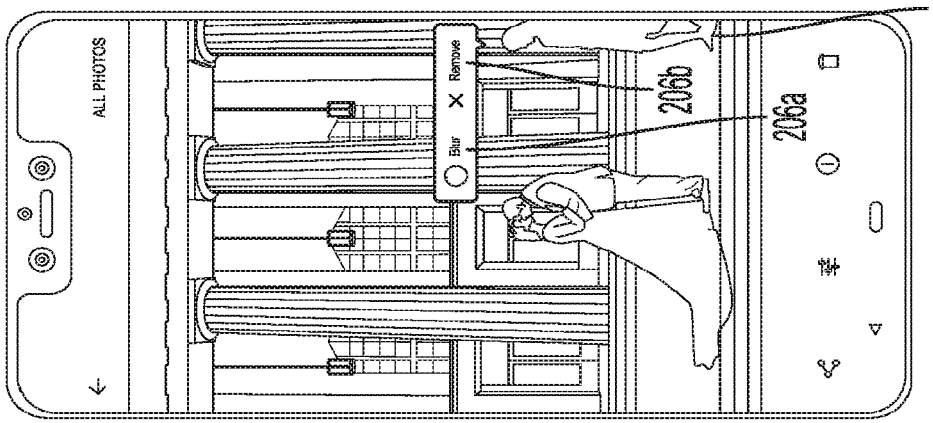

When the user taps on or otherwise interacts with remove button 206b, the editing application may implement an object removal process to remove the selected person from the image, and generate replacement image content for the person. Further, as shown in FIG. 2C the editing application may display an updated version of the image, where the person has been replaced with the replacement image content 204c.

Figure 2D:
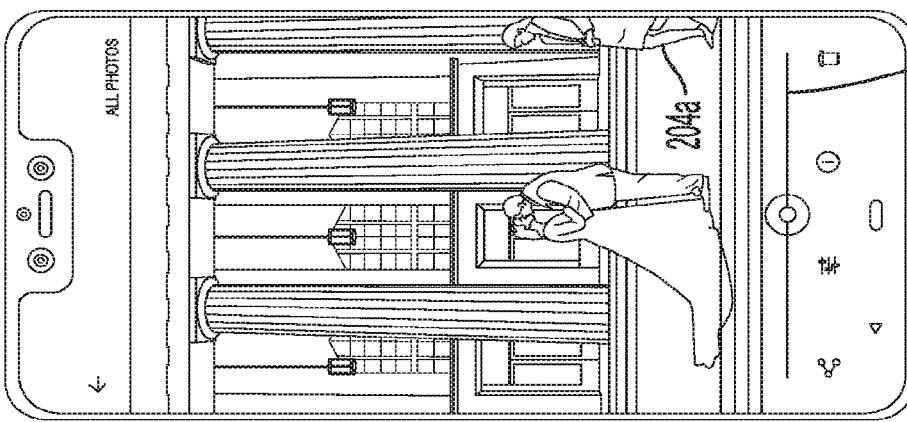

When the user taps on or otherwise interacts with blur button 206a, the editing application may implement a blurring process to replace the selected person 204b with a blurred version of the person. For example, the editing application may generate replacement image content 204d where the selected person is blurred to simulate movement during image capture (e.g., to simulate a longer exposure than that which was used to capture the image). As shown in FIG. 2D, the editing application may then insert or otherwise update the displayed image with the blurred replacement image content 204d. The editing application may also provide a slider 208, which allows the user to adjust the amount of blurring to be applied to the person.

B. Selective Zoom

In some implementations of method 100, processing the first image may involve applying a selective-zoom process. The selective-zoom process allows a user to change the size (or the apparent depth) of at least one selected object in the image frame, without changing the size (or apparent depth) of the remainder of the image.

For example, the selective-zoom process may involve the computing device using segmentation data to identify one or more objects in the first image. As such, when the computing device receives user-input indicating selection of at least one of the identified objects, the computing device can apply the selective-zoom process to change the size of the at least one selected object in the image, relative to a background in the image. For instance, a process may be executed to zoom in or out on the selected object (to change the apparent depth of the object), without changing the apparent depth of the remainder of the image.

Figure 3A:
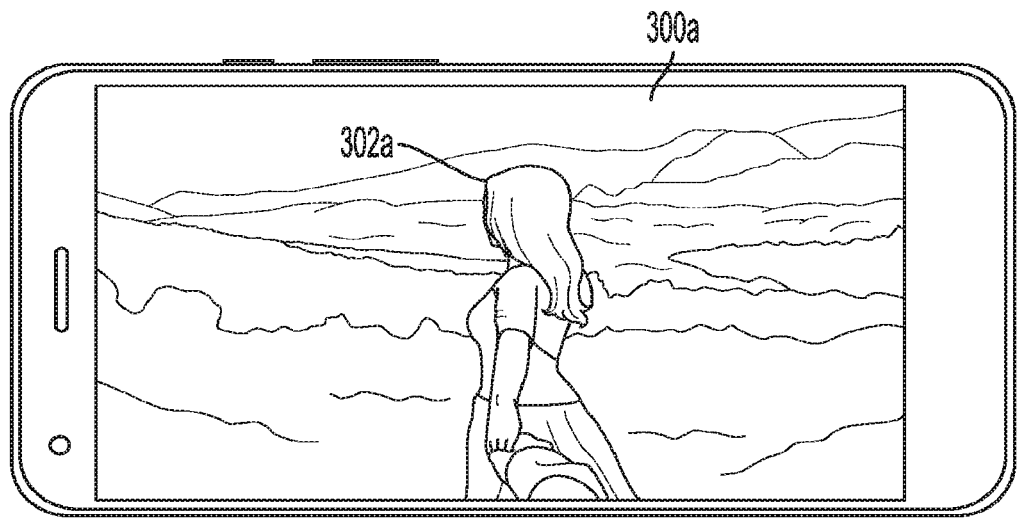
FIGS. 3A and 3B show another graphic interface for editing and/or interacting with an image, according to example embodiments.
Figure 3B:
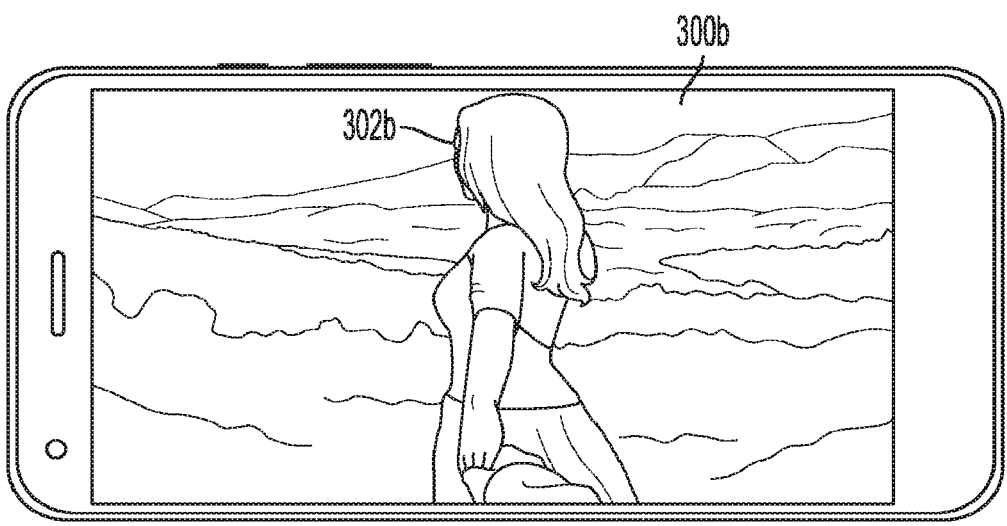

FIGS. 3A and 3B show a graphic interface for editing an image, where a selective zoom feature is provided. In particular, FIGS. 3A and 3B show screens from an image editing application where a photo is being edited. In this example, the image editing application is provided via a touchscreen device, such as a mobile phone with a touchscreen.

In FIG. 3A, the editing application displays a first version 300a of a photo. Segmentation masks are provided that identify at least one object in the photo. In particular, a person 302a is identified by the segmentation data. Accordingly, the editing application may allow a user to selectively zoom in or out on person 302a (and possibly other objects) by using the touchscreen.

For example, when the user performs a two-finger pinch (e.g., moving their fingers closer together on the touchscreen) on or near to person 302a, this may be interpreted by the computing device as an instruction to selectively zoom out on person 302a. Conversely, when the user performs a two-finger reverse pinch (e.g., moving their fingers apart on the screen) over or near to person 302a, this may be interpreted by the computing device as an instruction to selectively zoom in on person 302a. Note that the mapping of a pinch gesture and a reverse pinch gesture to zoom-out and zoom-in could be reversed. Further, other types of touch gestures and/or other types of user input and user-input devices could also be used for selective zoom.

Further, depth information for a selected object may be utilized to generate a zoomed-in version of the selected object. Specifically, if the selected object were to move closer to the camera lens while maintaining the same pose, and a first portion of the selected object is closer to the camera lens than a second portion of the selected object, the size of the first portion in the image frame may increase more than the size of the second portion in the image frame (e.g., in the camera's field of view). A selective zoom process may utilize depth information to simulate the foregoing effect in post processing.

For instance, a computing device may analyze the portion of a depth map for image 300a that corresponds to person 302a as identified by a segmentation mask for the image. This portion of the depth map may indicate that the outstretched hand of person 302a is much closer to the camera's vantage point than the person's head. Provided with such depth information for a particular object in an image, the selective zoom process may generate an enlarged version of the object, where portions of the object that were closer to the camera are enlarged to a greater extent than portions of the object that were further away.

For instance, FIG. 3B shows an updated version 300b of the image shown in FIG. 3A, which includes enlarged version 302b of the selected person. To generate the enlarged version 302b of the person, the selective zoom process may increase the size of portions of the person's body proportionally to the depth of those portions, such that parts of the person's body that are closer to the camera (e.g., the person's outstretched hand) are enlarged more than portions of the person's body that were further from the camera (e.g., the person's head). Further, note that the above described process may be reversed to proportionally reduce an object based on depth information, when a selective zoom process is used to zoom out on an object.

Further, note that in order to selectively zoom in on an object after image capture without affecting the apparent depth of the object's background, an editing application will typically need to enlarge the object in the image frame, such that some surrounding background areas are covered in the modified image. On the other hand, to selectively zoom out on an object after image capture without affecting the apparent depth of the object's background, an editing application will typically need to generate replacement background image content to replace portions of the image that are uncovered when the size of the selected object is reduced. Depth information could be used to generate the replacement image content, as described above.

C. Simulated Parallax Effect/Perspective Adjustment

In some implementations of method 100, processing the first image may involve applying a perspective adjustment process that simulates a change in the camera's perspective by moving at least one selected subject in the image relative to the image background (e.g., by simulating a parallax effect). This process may be utilized to provide an interactive image (e.g., a panoramic self or "pano-selfie") where the user can change the vantage point of a captured image.

For example, the perspective adjustment process may utilize segmentation data to identify at least one subject object and at least one background area in the image. A depth map may also be utilized to determine first depth information for the at least one subject, and second depth information for the at least one background area. The perspective adjustment process may then compare the first and second depth information to determine an amount of movement for a background area in the image frame, per unit of movement of at least one subject in the image frame. As such, an image may be processed using the perspective adjustment process to generate a new or updated image data by shifting the position of the subject object in the image frame, and shifting the background proportionally, based on the relative depth of the background as compared to the subject object (e.g., such that the background shift is greater, the closer the background is to the subject object, and vice versa).

Provided with the perspective adjustment process, a computing device may provide an application for editing and/or interacting with image data, via which a user can interact with an image and move a selected object or objects within the image frame. For instance, FIGS. 4A to 4C show a graphic interface for editing and/or interacting with an image, where a perspective adjustment process is utilized to provide for a perspective adjustment feature.

Figure 4A:
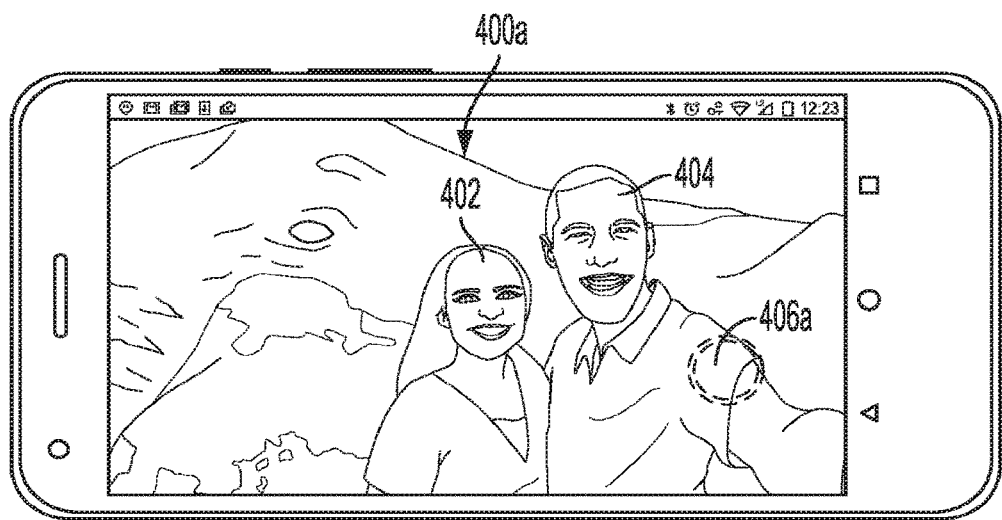
FIGS. 4A to 4C show another graphic interface for editing and/or interacting with an image, according to example embodiments.
Figure 4B:
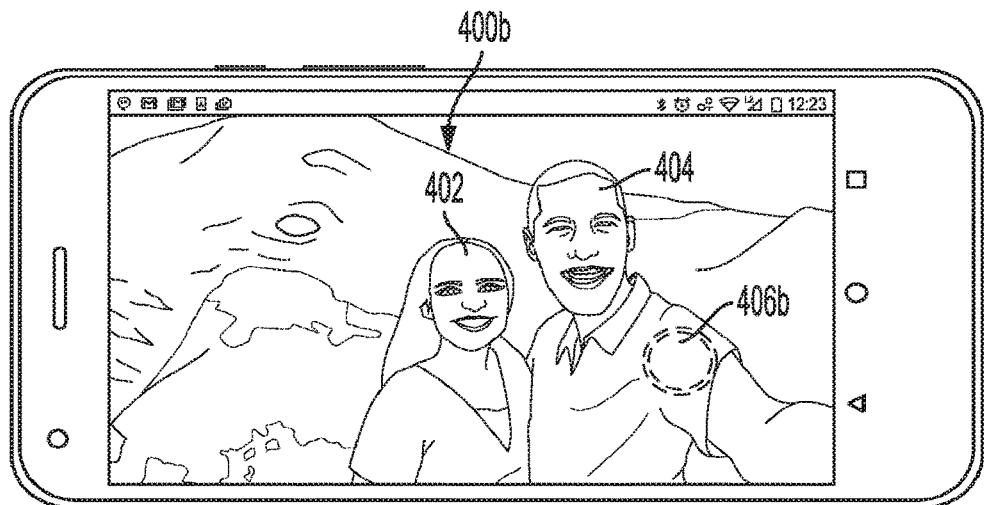
Figure 4C:
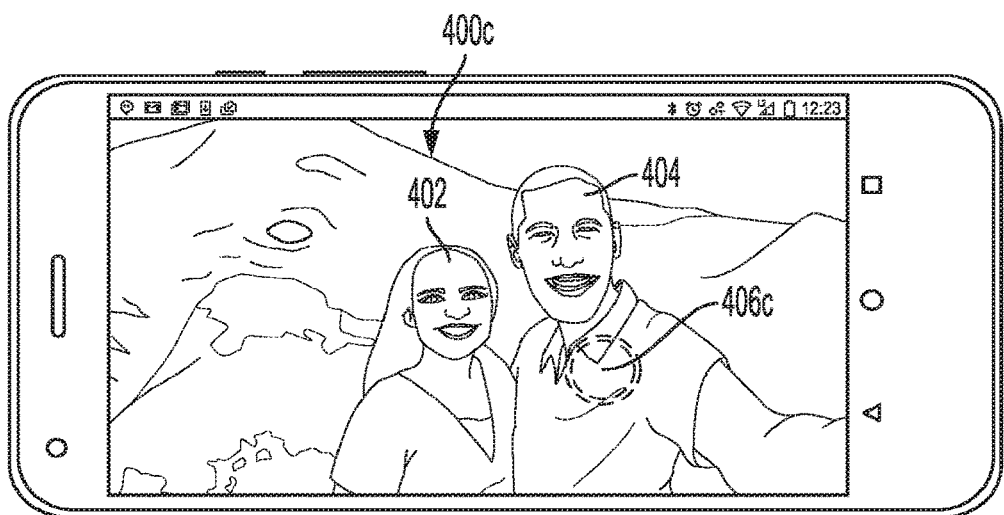

FIG. 4A shows a first screen 400a from an illustrative application for editing and/or interacting with an image. In this example, the application is provided via a touchscreen device, such as a mobile phone with a touchscreen. Screen 400a shows an image of a scene, where at least two objects are identified by segmentation data for the image—person 402 and person 404. The application may allow the user to change the image to simulate a change in perspective of the camera (e.g., to generate an image that looks as if it was captured from a different vantage point from the original image).

For example, the application may allow the user to change the vantage point of the image by moving their finger on the touchscreen. In the screens 400a to 400c shown in FIGS. 4A to 4C, circles 406a to 406c represent locations where touch is detected on the touchscreen (e.g., with a finger or a stylus). Note that in practice, the circles 406a to 406c might not be displayed. Alternatively, each circle 406a to 406c could be displayed on the touchscreen to provide feedback as to where touch is detected. The change sequence of screen 4A to screen 4B to screen 4C represents the user moving their finger from right to left on the touchscreen (facing the page), from the location corresponding to circle 406a to the location corresponding to circle 406c. As the user performs this movement on the touchscreen, the application modifies the displayed image by: (i) moving the subject objects (person 402 and person 404) to the left in the image frame, and (ii) moving the background (e.g., the mountains) to a lesser extent, or perhaps not moving the background at all (depending on the depth information for the background).

In a further aspect, depth information for a selected object or objects may be utilized to generate a depth-aware movement of the object or objects, that more realistically simulates a change in the perspective from which the image was captured. More specifically, when a camera perspective changes relative to an object at a fixed location, portions of the object that are closer to the camera will move more in the camera's field of view than portions of the object that are further from the camera. To simulate this effect from a single image (or to more accurately simulate frames from perspectives in between those of stereo cameras), a perspective adjustment process may utilize depth information for selected object to move the subject in a depth-aware manner.

For instance, a computing device may analyze the portion of a depth map that corresponds to person 402 and person 404. This portion of the depth map may indicate that the outstretched forearm of person 404 is much closer to the camera's vantage point than the person 402 (and in practice, may indicative relative depth of different parts of person 402 and person 404 with even more granularity). Provided with such depth information for a particular subject in an image, the perspective adjustment process may respond to a user input indicating an amount of movement by generating a modified version of the subject, where portions of the subject that were closer to the camera (e.g., the forearm of person 404), are moved to a greater extent in the image frame, as compared to portions of the object that were further away from the camera (e.g., the head of person 402).

D. Depth-Aware Lighting Effects

When a mobile computing device user takes an image of an object, such as a person, the resulting image may not always have ideal lighting. For example, the image could be too bright or too dark, the light may come from an undesirable direction, or the lighting may include different colors that give an undesirable tint to the image. Further, even if the image does have a desired lighting at one time, the user might want to change the lighting at a later time.

Accordingly, in some implementations of method 100, processing the first image may involve applying a depth-variable light-source effect (e.g., a virtual light source) to the first image. For example, applying a lighting effect may involve a computing device determining coordinates for a light source in a three-dimensional image coordinate frame. Then, based at least in part on the segmentation data for an image, the computing device may identify at least one object and at least one background area in the image. Further, based on a depth map for the same image, the computing device may determine respective locations in the three-dimensional image coordinate frame of one or more surfaces of the at least one object. Then, based at least in part on (a) the respective locations of the one or more surfaces of the at least one object, and (b) the coordinates of the light source, the computing device may apply a lighting effect to the one or more surfaces of the selected object or objects.

In a further aspect, applying the depth-variable light-source effect could involve the computing device using a depth map for the image to determine depth information for at least one background area in the image (e.g., as identified by a segmentation mask for the image). Then, based at least in part on (a) the depth information for the at least one background area, (b) the coordinates of the light source, and (c) coordinates of the at least one object in the three-dimensional image coordinate frame, the computing device can generate shadow data for the background area corresponding to the at least one object and the light source. The shadow data may be used to modify the image with shadows from objects that correspond to the virtual light source in a realistic manner.

E. Depth-Aware Virtual Objects

In some implementations of method 100, processing the first image may involve performing a graphic-object addition process to add a graphic (e.g., virtual) object to the first image. By utilizing a segmentation mask or masks in combination with depth information for the same image or images, an example graphic-object addition process may allow for augmented-reality style photo editing, where virtual objects are generated and/or modified so as to more realistically interact with the real-world objects in the image or images.

FIGS. 5A to 5E show screens 500a to 500e from an illustrative graphic interface that provides for augmented-reality style image editing using a graphic-object addition process. In particular, the illustrated graphic interface may provide features for adding, manipulating, and editing a virtual object, and/or features for changing the manner in which a virtual object interacts with real-world objects in an image.

An illustrative graphic-object addition process may be utilized by an application to provide an interface for editing and/or interacting with an image. More specifically, an illustrative graphic-object addition process can utilize segmentation data for an image to identify one or more objects in an image, and can utilize a depth map for the image to determine first depth information for at least one identified object. For example, a segmentation mask for the image shown in screen 500a of FIG. 5A may identify person 502. The segmentation mask may then be utilized to identify a portion of a depth map for the image, which corresponds to person 502.

Note that the circles 507a to 507e shown in FIGS. 5A to 5E represent the location or locations where touch is detected on the touchscreen (e.g., with a finger or a stylus) in each screen 500a to 500e. In practice, the circle might not be displayed in the graphic interface. Alternatively, the circle graphic (or another type of graphic) could be displayed to provide feedback indicating where touch is detected.

Figure 5A:
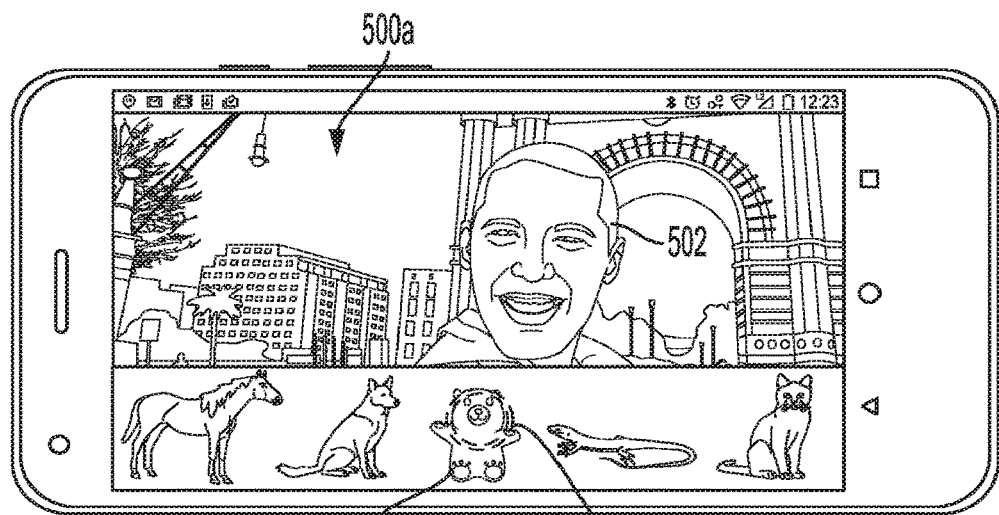
FIGS. 5A to 5E show another graphic interface for editing and/or interacting with an image, according to example embodiments.
Figure 5B:
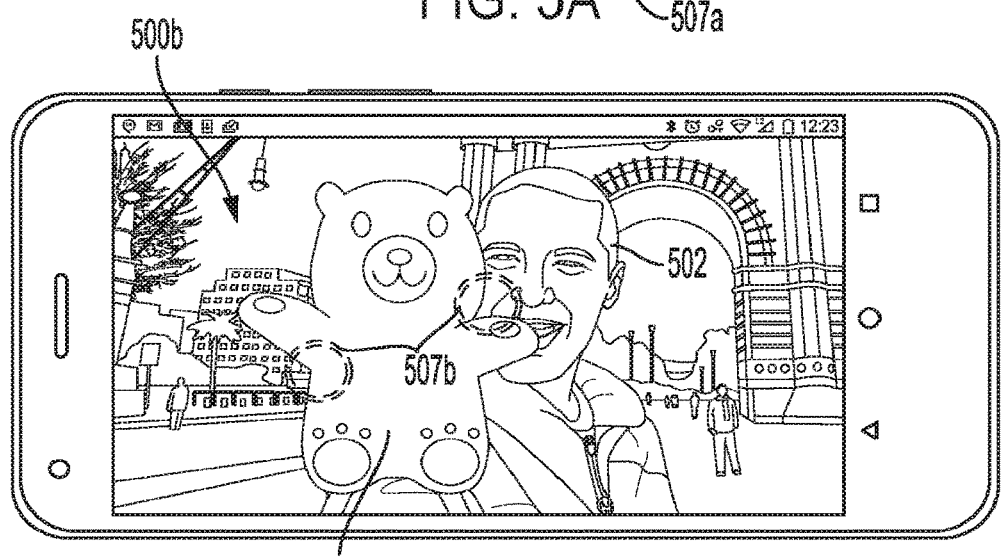
Figure 5C:
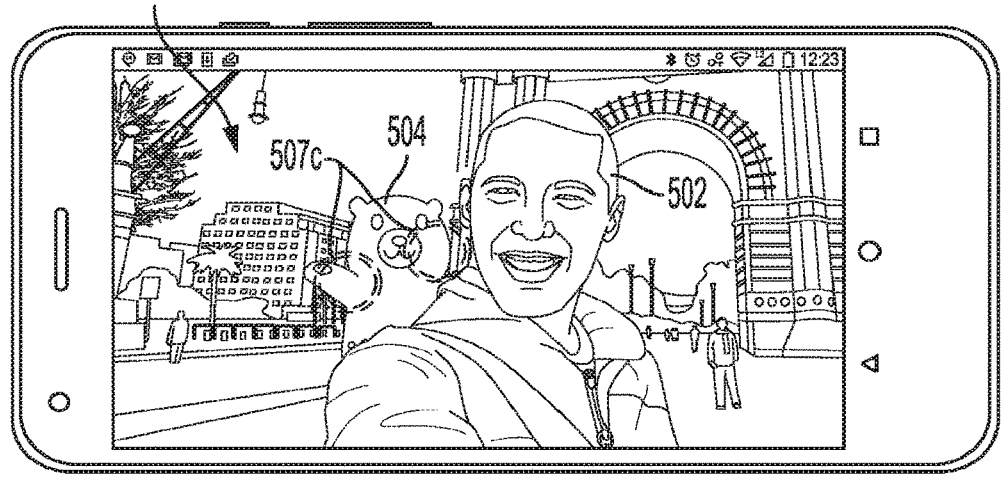
Figure 5D:
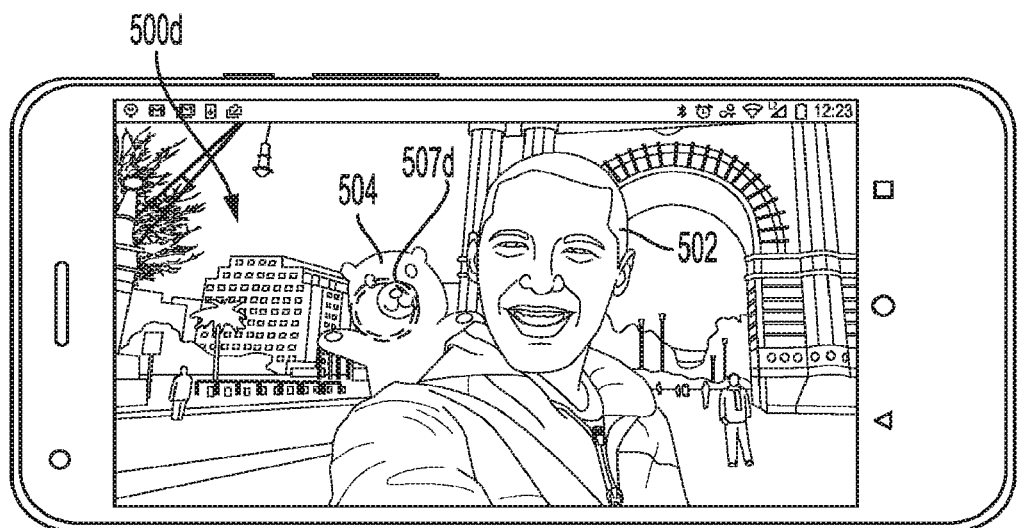
Figure 5E:
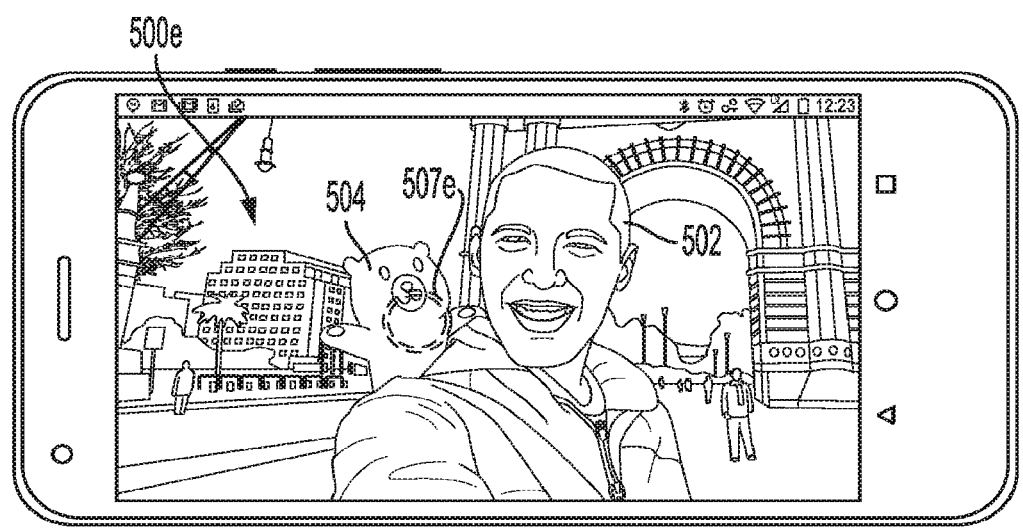

As shown in FIG. 5A, the application may receive user input data indicating a selection of a virtual object for addition to an image. For example, as shown in screen 500a, the user could select a virtual object by tapping or touching a virtual object 504 displayed in a menu of available virtual objects. The virtual object 504 could then be displayed in the graphic interface, as shown in screen 500b of FIG. 5B. The user may then use the touchscreen to place and manipulate the location of the virtual object. Notably, as the user manipulates the object, an illustrative graphic-object addition process may utilize segmentation data and depth information for objects in the scene to update a rendering of the graphic object 504 in the image.

For example, screens 500b to 500c illustrate performance of a pinch gesture on the touchscreen. The application may interpret a pinch gesture as an instruction to change the apparent depth of the graphic object 504 in the image. If the magnitude of the pinch gesture changes the apparent depth of graphic object 504 such that it is further from the camera's vantage point than a real-world object, then the graphic object may be re-rendered such that it is occluded (at least partially by the real-world object. Thus, as shown by screen 500c of FIG. 5C, the application has responded to the pinch gesture by: (i) reducing the size of graphic object 504 such that the graphic object appears as if it is further from the camera's vantage point (as compared to its apparent depth on screen 500b), and (ii) masking (or removing) a portion of the graphic object that overlaps with person 502, such that the masked portion appears to be occluded by (and thus behind) person 502.

In a further aspect, the example interface shown in FIGS. 5A to 5E may allow a user to control rotation and location within the image (e.g., two-dimensional rotation and location in the image plane) using two-point or multi-touch gestures, and also to control pose (e.g., three-dimensional rotation) using single-point or single touch gestures. Specifically, a user could use two-finger sliding gestures to move the graphic object 504 in the image frame (e.g., horizontally or vertically, without changing its size), and could use two-finger rotation gestures to rotate the graphic object in the image frame, as illustrated by the rotation of graphic object 504 that occurs between FIG. 5C and FIG. 5D. Additionally, the user could change the three-dimensional pose with a single-touch sliding gesture on the touchscreen, as illustrated by the change in pose of graphic object 504 that occurs between FIG. 5D and FIG. 5E.

In another aspect, an example image editing application may utilize a combination of segmentation masks and a depth map to automate the insertion of a virtual graphic object into an image or video in a more realistic manner. In particular, the user may indicate a general location in the two-dimensional coordinate system of the image frame (e.g., by tapping a touchscreen at the desired location), and the image editing application may then determine an exact location and pose for the virtual object in a corresponding 3D coordinate system (e.g., the coordinate system defined by the image frame coordinates and the depth map).

Figure 6A:
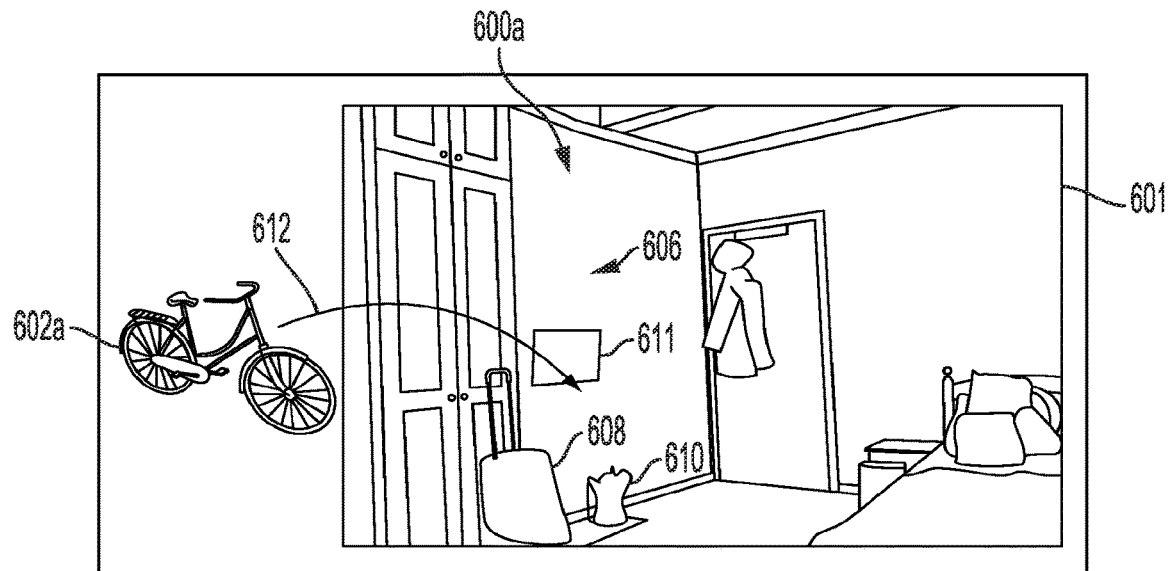
FIGS. 6A and 6B show another graphic interface for editing and/or interacting with an image, according to example embodiments.
Figure 6B:
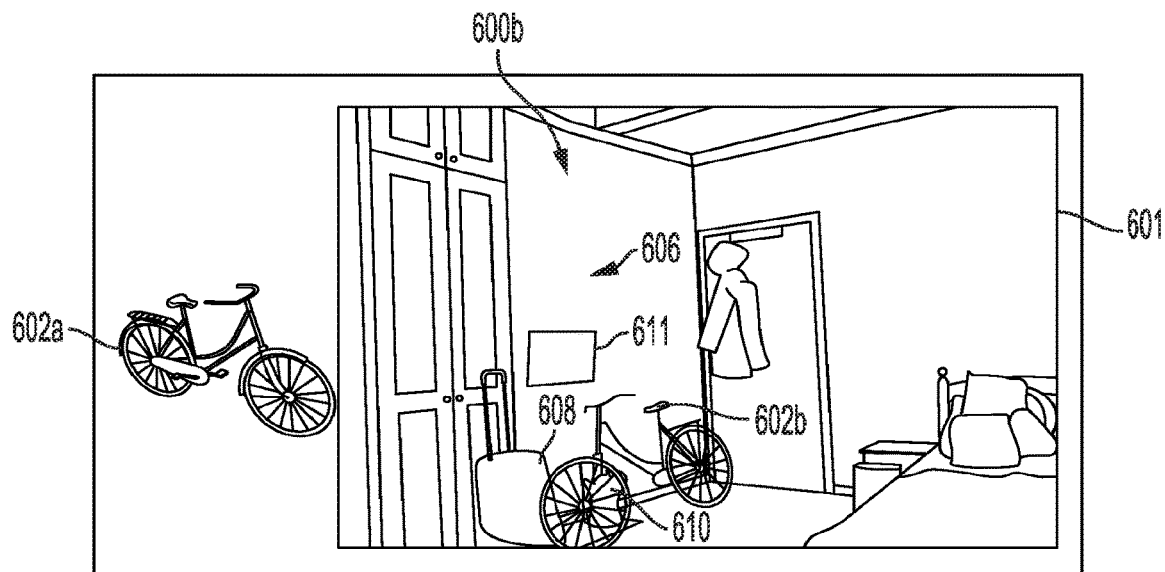

FIGS. 6A and 6B show screens 600a and 600b from an illustrative graphic interface that provides for image editing using a graphic-object addition process to automatically insert a virtual graphic object 602a into an image 601 (or video) in a more realistic manner. In the illustrated example, segmentation data for image 601 provides segmentation masks for at least a suitcase 608 and boots 610, which separate these objects from the background.

Further, a virtual bike 602a may be displayed in a graphic menu for virtual objects. Shape and size parameters may be defined for the virtual bike 602a, which specify relative 3D coordinates for the volume of the bike (e.g., a dimensionless 3D vector model), and a desired size range for a realistic bike sizing (e.g., similar to the size of a real-world bike on which the 3D model for virtual bike 602a is based).

The user may tap the touchscreen at the location indicated by arrow 612 in screen 600a (on the wall under the television in image 601). Note that arrow 612 may appear after the user taps the touchscreen. Alternatively, the image editing application may automatically scan the image 601 to determine a location or locations where insertion of the bike 602a is possible and/or expected to be visually pleasing, and automatically display arrow 612 to suggest the placement of the bike 602a against the wall in image 601. In either, case the user may tap the touchscreen at or near the end of arrow 612 (or provide another form of input) to instruct the image editing application to insert the virtual bike 602a in image 601. Upon receipt of this instruction, the application may determine a size, location, and pose for virtual bike 602a in the coordinate system defined by the image frame and the depth map for the image 601. In so doing, the application may take segmentation masks for image 601 into account in order to more accurately determine the appropriate size, location, pose, and/or other modifications for insertion of the virtual bike into image 601. Once the size, location, and pose are determined, the application may render a version of virtual bike 602b, and insert the rendered version 602b into image 601, as shown in screen 600b of FIG. 6B.

To generate the virtual bike rendering 602b shown in screen 600b, the editing application may use segmentation data to identify an area in the image 601 where the virtual bike can be inserted. For example, the application may analyze segmentation masks for objects in image 601, and the background area outside the object masks, to find an area where the virtual bike can fit. In the illustrated example, the background area with the side wall may be identified in this manner. The depth map for the identified side wall may then be analyzed to determine the 3D pose with which to render the virtual bike, and the location in image 601 at which to insert the rendered virtual bike 602b.

In a further aspect, the virtual bike rendering 602b may be further based in part on segmentation masks for suitcase 608, boots 610, television 611, and/or other objects in image 601. The segmentation masks for suitcase 608, boots 610, television 611, may have associated data defining what each mask is and characteristics thereof. For example, the mask for suitcase 608 may have associated metadata specifying that the shape that is masked corresponds to a carry-on suitcase, as well as metadata indicating real-world dimensions of the particular suitcase, or a range of real-world dimensions commonly associated with carry-on suitcases. Similar metadata may be provided indicating the particular type of object and real-world sizing parameters for other segmentation masks in image 601. By combining this information with a depth map of the image, the editing application may determine what the pose and relative position of the real-world objects captured in image 601, and render a virtual object to interact in a realistic-looking manner with the objects captured in the image.

Further, the editing application may use segmentation masks for suitcase 608, boots 610, television 611, and/or other objects in image 601, and possibly the depth map as well, to render a version of the virtual bike that more realistically interacts with these objects. For example, the pose of the bike may be adjusted to lean at a greater angle than it would be if boots 610 were not present, so that the boots 610 are behind the rendered virtual bike 602b in screen 600b. Further, in cases where the virtual object is behind a certain object mask or masks, the object mask or masks may be applied to the rendering to mask off portions of the rendered virtual object so it appears to be behind the corresponding objects in the image.

Figure 7A:
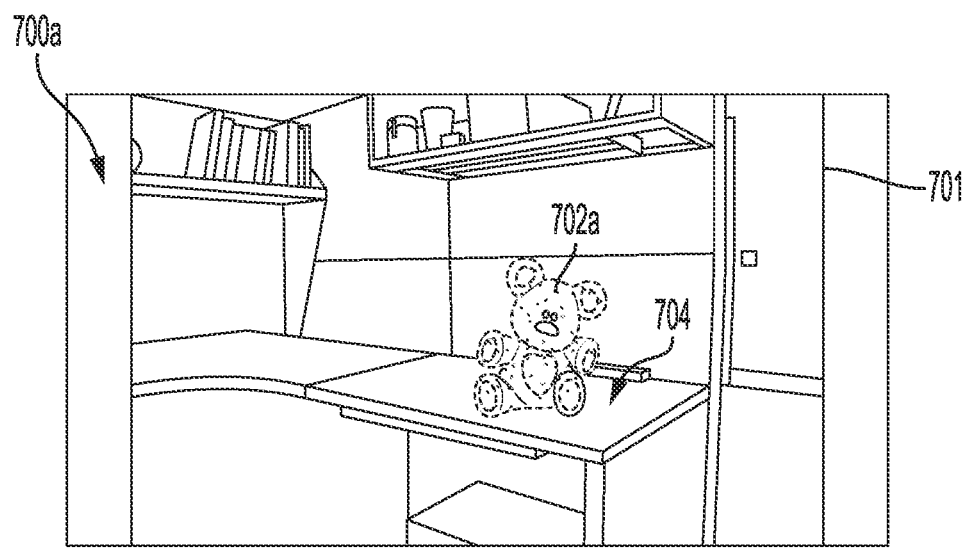
FIGS. 7A to 7C show another graphic interface for editing and/or interacting with an image, according to example embodiments.
Figure 7B:
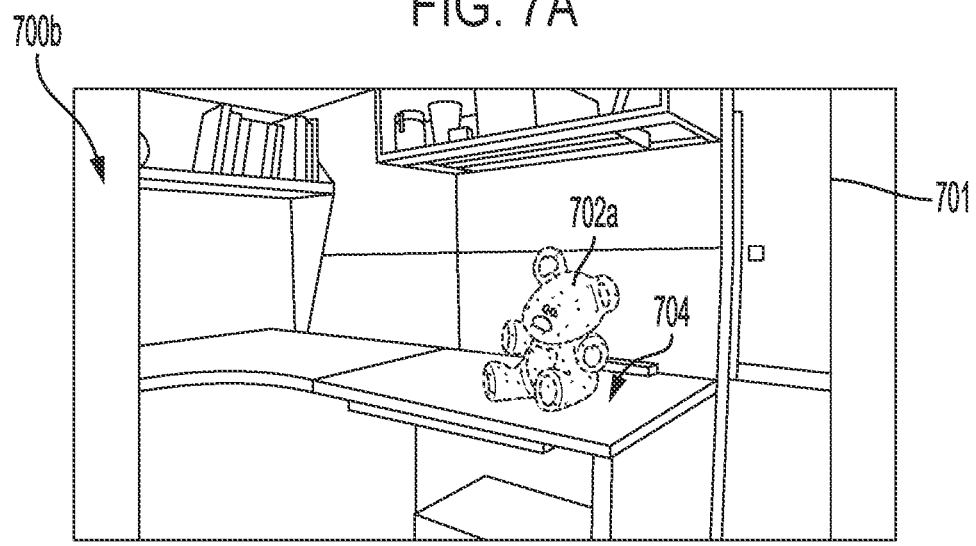
Figure 7C:
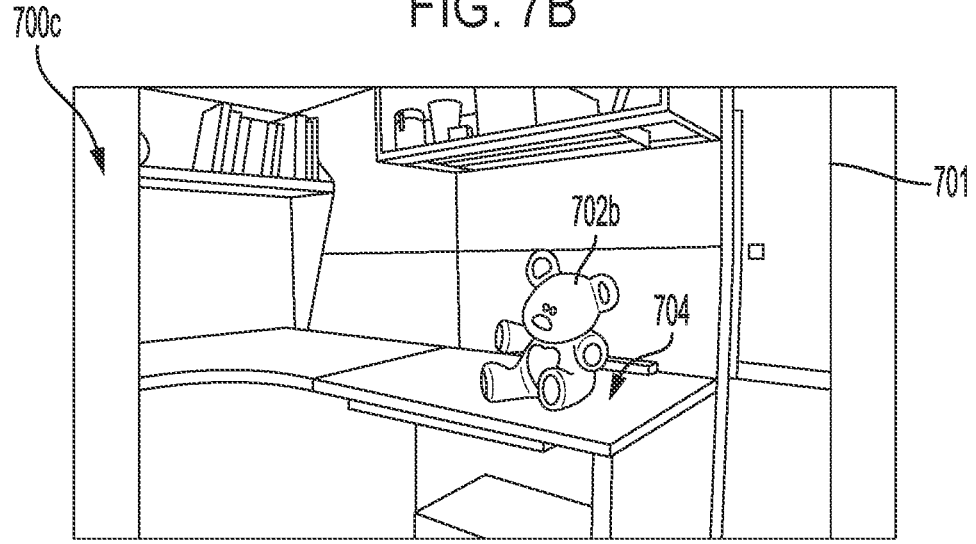
Figure 8A:
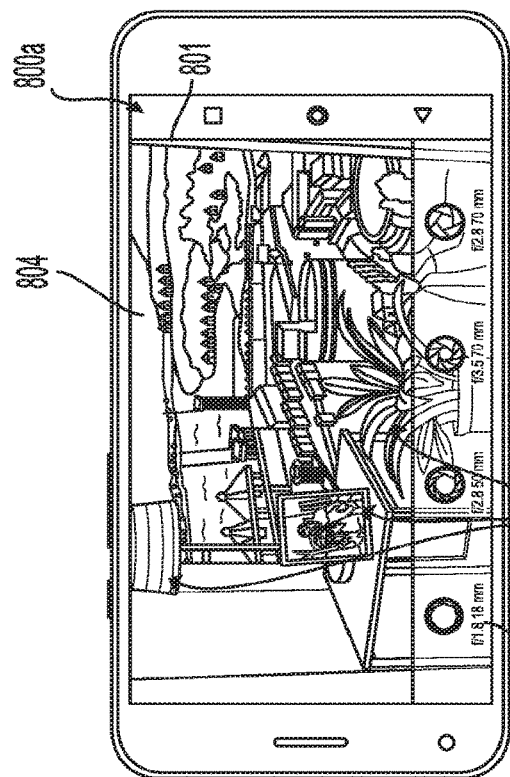
FIGS. 8A to 8D show another graphic interface for editing and/or interacting with an image, according to example embodiments.
Figure 8B:
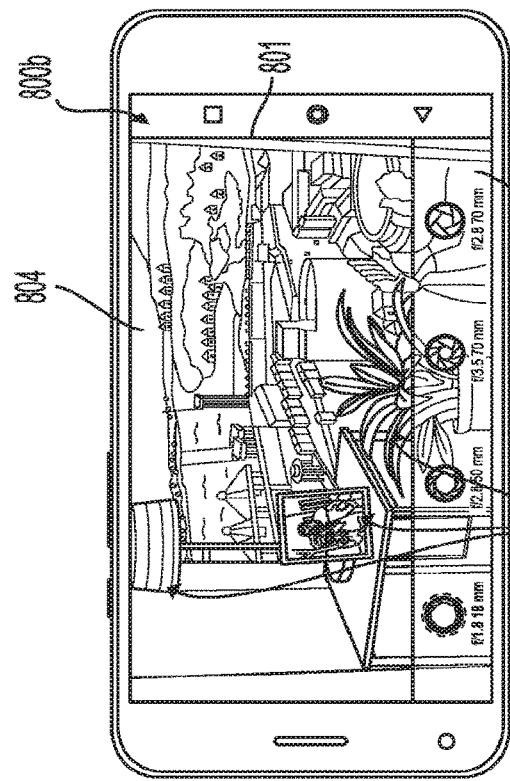
Figure 8C:
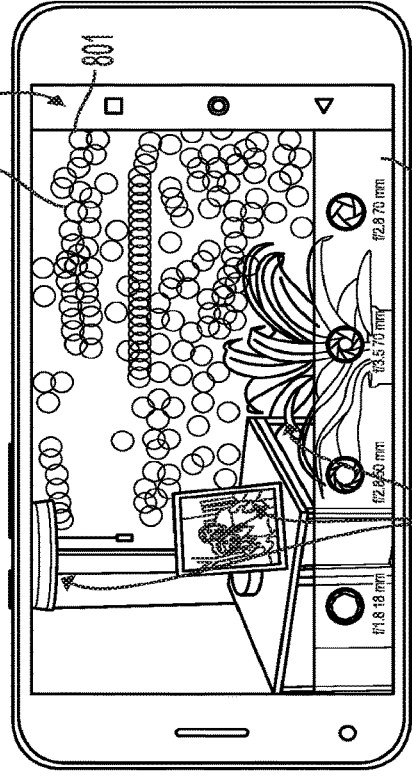
Figure 8D:
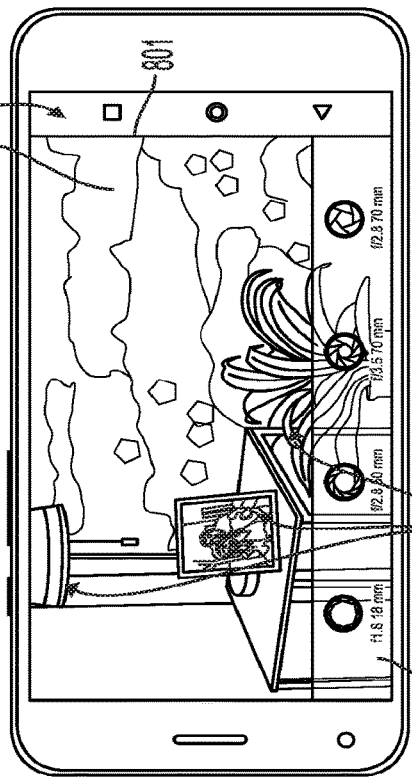

As another example, FIGS. 7A to 7C show screens 700a to 700c from an illustrative graphic interface that provides for image editing using a graphic-object addition process to automatically insert a virtual graphic object 702a into an image 701 (or video) in a more realistic manner. In the illustrated example, a depth map is provided for image 701, and segmentation data for image 701 provides a segmentation mask for at least a desktop surface 704.

The user may place a virtual object into the image in a similar manner as described in reference to FIGS. 6A and 6B, or in another manner. In the illustrated example, a virtual stuffed animal 702a is being added to the image 701. As shown in screens 700a and 700b, the editing application may allow the user to change the location and pose of the virtual stuffed animal 702a via a graphic touchscreen interface, or via another type of user interface. When the user is satisfied with the general placement, and provides an instruction to this effect, the editing application may use the general pose and location indicated by the user, in combination with the segmentation mask(s) and the depth map for the image 701, to determine a surface on which to place the virtual stuffed animal 702a. For example, as shown in screen 700c the editing application may generate a rendering 702b of the virtual stuffed animal such that its location and pose make it appear as if the virtual stuffed animal is sitting on the desktop surface 704, in the 3D pose indicated by the user. Other examples are also possible.

F. Bokeh Effect

In some implementations of method 100, processing the first image may involve applying a depth-aware bokeh effect to blur the background of an image. In particular, segmentation masks may be used to separate the background of an image from objects in the foreground of the image. Depth information for the background may then be utilized to determine an amount of blurring to be applied to the background.

More specifically, the amount of blurring applied to the background may vary according to depth information from a depth map, such that a background that is further away may be blurred more than a closer background. Further, the depth-variable blurring effect may vary between different areas in the background, such that background areas that are further from the camera's vantage point will be blurred more than background areas that are closer to the camera's vantage point.

For example, FIGS. 8A to 8D show screens 800a to 800d from an illustrative graphic interface, which provides for image editing using a depth-aware bokeh effect. In the illustrated example, segmentation data for image 801 provides segmentation masks for at least foreground objects 806 (e.g., the table, lamp, picture, and plant), such that the background 804 can be separated from the foreground objects 806. Further, once the background 804 is separated from the foreground objects 806, a depth map for image 801 can be used to determine depth information specifically for the background 804. The editing application can thus use the depth information for background 804 to determine an amount or degree of a blurring (e.g., bokeh) effect to apply the background 804.

In a further aspect, the graphic interface may include a virtual lens selection menu 808, which allows the user to simulate bokeh that would have resulted if the image 801 had been captured using different types of lenses. In particular, the virtual lens selection menu 808 may allow a user to select between different lens types having different apertures (e.g., different F-stops, such as f/1.8, f/2.8, and so on) and/or different focal lengths (e.g., 18 mm, 50 mm, and 70 mm). Generally, the amount of background blurring, and the extent of background blurring (e.g., depth of field) is a function of the aperture and focal length of a lens. The more open the aperture of a lens is, the stronger the background blurring will be, and the narrower the depth of field will be, and vice versa. Additionally, the longer the focal length of a lens is, the stronger the background blurring will be, and the narrower the depth of field will be, and vice versa.

The virtual lens selection menu 808 in the illustrated example provides for four lenses: an f/1.8 18 mm lens, an f/2.8 50 mm lens, an f/3.5 70 mm lens, and an f/2.8 70 mm lens. When the user selects a lens from the virtual lens selection menu 808, the editing application may determine a lens profile including a depth of field and an amount of blurring (perhaps varying by depth) corresponding to the selected lens. The depth map for the background 804 may then be compared to the lens profile to determine what areas of the background to blur, and how much to blur those areas.

IV. EXAMPLE COMPUTING DEVICES

Figure 9:
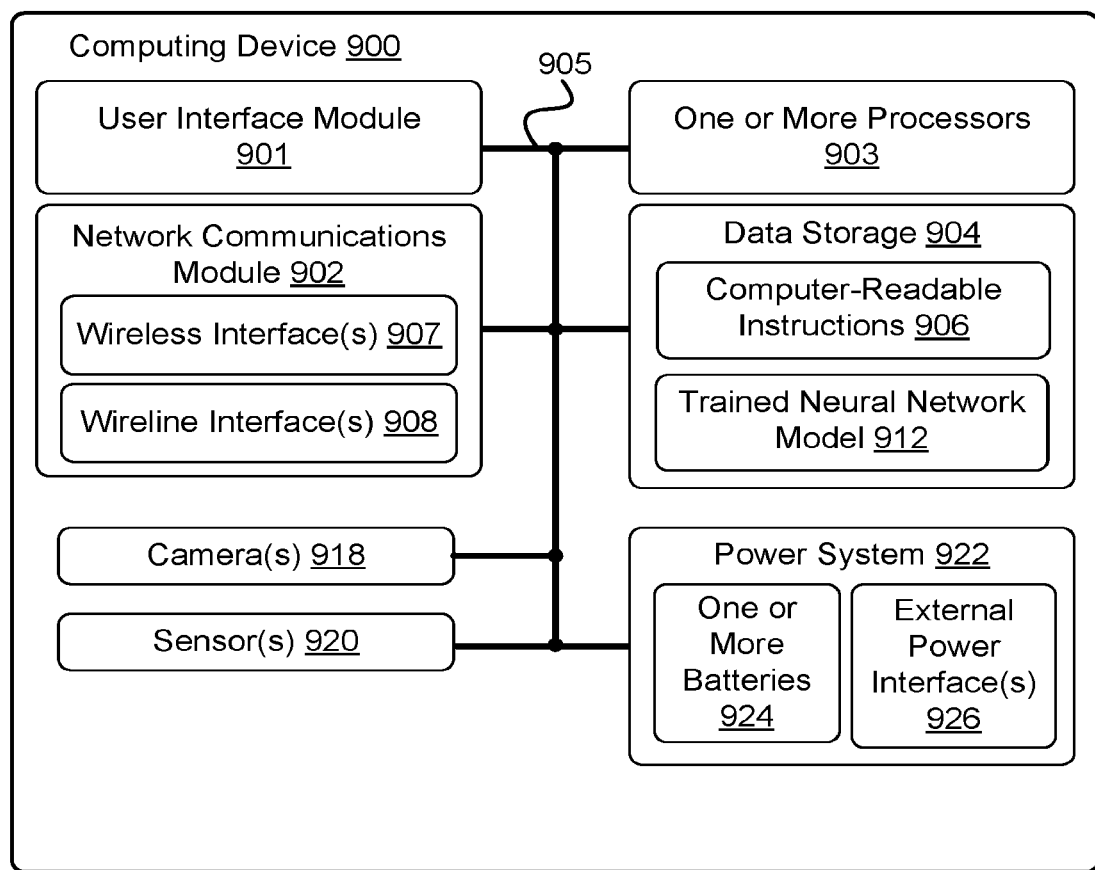
FIG. 9 is a block diagram of a computing device, in accordance with example embodiments.

FIG. 9 is a block diagram of an example computing device 900, in accordance with example embodiments. In particular, computing device 900 shown in FIG. 9 can be configured to perform the various depth-aware photo editing and processing functions described herein. The computing device 900 may take various forms, including, but not limited to, a mobile phone, a standalone camera (e.g., a DSLR, point-and-shoot camera, camcorder, or cinema camera), tablet computer, laptop computer, desktop computer, server system, cloud-based computing device, a wearable computing device, or a network-connected home appliance or consumer electronic device, among other possibilities.

Computing device 900 may include a user interface module 901, a network communications module 902, one or more processors 903, data storage 904, one or more cameras 918, one or more sensors 920, and power system 922, all of which may be linked together via a system bus, network, or other connection mechanism 905.

User interface module 901 can be operable to send data to and/or receive data from external user input/output devices. For example, user interface module 901 can be configured to send and/or receive data to and/or from user input devices such as a touch screen, a computer mouse, a keyboard, a keypad, a touch pad, a track ball, a joystick, a voice recognition module, and/or other similar devices. User interface module 901 can also be configured to provide output to user display devices, such as one or more cathode ray tubes (CRT), liquid crystal displays, light emitting diodes (LEDs), displays using digital light processing (DLP) technology, printers, light bulbs, and/or other similar devices, either now known or later developed. User interface module 901 can also be configured to generate audible outputs, with devices such as a speaker, speaker jack, audio output port, audio output device, earphones, and/or other similar devices. User interface module 901 can further be configured with one or more haptic devices that can generate haptic outputs, such as vibrations and/or other outputs detectable by touch and/or physical contact with computing device 900. In some examples, user interface module 901 can be used to provide a graphical user interface (GUI) for utilizing computing device 900.

Network communications module 902 can include one or more devices that provide one or more wireless interfaces 907 and/or one or more wireline interfaces 908 that are configurable to communicate via a network. Wireless interface(s) 907 can include one or more wireless transmitters, receivers, and/or transceivers, such as a Bluetooth™ transceiver, a Zigbee® transceiver, a Wi-Fi™ transceiver, a WiMAX™ transceiver, and/or other similar type of wireless transceiver configurable to communicate via a wireless network. Wireline interface(s) 908 can include one or more wireline transmitters, receivers, and/or transceivers, such as an Ethernet transceiver, a Universal Serial Bus (USB) transceiver, or similar transceiver configurable to communicate via a twisted pair wire, a coaxial cable, a fiber-optic link, or a similar physical connection to a wireline network.

One or more processors 903 can include one or more general purpose processors, and/or one or more special purpose processors (e.g., digital signal processors, tensor processing units (TPUs), graphics processing units (GPUs), application specific integrated circuits, etc.). One or more processors 903 can be configured to execute computer-readable instructions 906 that are contained in data storage 904 and/or other instructions as described herein.

Data storage 904 can include one or more non-transitory computer-readable storage media that can be read and/or accessed by at least one of one or more processors 903. The one or more computer-readable storage media can include volatile and/or non-volatile storage components, such as optical, magnetic, organic or other memory or disc storage, which can be integrated in whole or in part with at least one of one or more processors 903. In some examples, data storage 904 can be implemented using a single physical device (e.g., one optical, magnetic, organic or other memory or disc storage unit), while in other examples, data storage 904 can be implemented using two or more physical devices.

Data storage 904 can include computer-readable instructions 906 and perhaps additional data. In some examples, data storage 904 can include storage required to perform at least part of the herein-described methods, scenarios, and techniques and/or at least part of the functionality of the herein-described devices and networks. In some examples, data storage 904 can include storage for a trained neural network model 912 (e.g., a model of a trained convolutional neural network such as a convolutional neural network). In particular of these examples, computer-readable instructions 906 can include instructions that, when executed by processor(s) 903, enable computing device 900 to provide for some or all of the functionality of trained neural network model 912.

In some examples, computing device 900 can include one or more cameras 918. Camera(s) 918 can include one or more image capture devices, such as still and/or video cameras, equipped to capture light and record the captured light in one or more images; that is, camera(s) 918 can generate image(s) of captured light. The one or more images can be one or more still images and/or one or more images utilized in video imagery. Camera(s) 918 can capture light and/or electromagnetic radiation emitted as visible light, infrared radiation, ultraviolet light, and/or as one or more other frequencies of light.

In some examples, computing device 900 can include one or more sensors 920. Sensors 920 can be configured to measure conditions within computing device 900 and/or conditions in an environment of computing device 900 and provide data about these conditions. For example, sensors 920 can include one or more of: (i) sensors for obtaining data about computing device 900, such as, but not limited to, a thermometer for measuring a temperature of computing device 900, a battery sensor for measuring power of one or more batteries of power system 922, and/or other sensors measuring conditions of computing device 900; (ii) an identification sensor to identify other objects and/or devices, such as, but not limited to, a Radio Frequency Identification (RFID) reader, proximity sensor, one-dimensional barcode reader, two-dimensional barcode (e.g., Quick Response (QR) code) reader, and a laser tracker, where the identification sensors can be configured to read identifiers, such as RFID tags, barcodes, QR codes, and/or other devices and/or object configured to be read and provide at least identifying information; (iii) sensors to measure locations and/or movements of computing device 900, such as, but not limited to, a tilt sensor, a gyroscope, an accelerometer, a Doppler sensor, a GPS device, a sonar sensor, a radar device, a laser-displacement sensor, and a compass; (iv) an environmental sensor to obtain data indicative of an environment of computing device 900, such as, but not limited to, an infrared sensor, an optical sensor, a light sensor, a biosensor, a capacitive sensor, a touch sensor, a temperature sensor, a wireless sensor, a radio sensor, a movement sensor, a microphone, a sound sensor, an ultrasound sensor and/or a smoke sensor; and/or (v) a force sensor to measure one or more forces (e.g., inertial forces and/or G-forces) acting about computing device 900, such as, but not limited to one or more sensors that measure: forces in one or more dimensions, torque, ground force, friction, and/or a zero moment point (ZMP) sensor that identifies ZMPs and/or locations of the ZMPs. Many other examples of sensors 920 are possible as well.

V. CONCLUSION

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The illustrative embodiments described in the detailed description, figures, and claims are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the ladder diagrams, scenarios, and flow charts in the figures and as discussed herein, each block and/or communication may represent a processing of information and/or a transmission of information in accordance with example embodiments. Alternative embodiments are included within the scope of these example embodiments. In these alternative embodiments, for example, functions described as blocks, transmissions, communications, requests, responses, and/or messages may be executed out of order from that shown or discussed, including substantially concurrent or in reverse order, depending on the functionality involved. Further, more or fewer blocks and/or functions may be used with any of the ladder diagrams, scenarios, and flow charts discussed herein, and these ladder diagrams, scenarios, and flow charts may be combined with one another, in part or in whole.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as non-transitory computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software and/or hardware modules in the same physical device. However, other information transmissions may be between software modules and/or hardware modules in different physical devices.

While various aspects and embodiments have been disclosed herein, other aspects and embodiments will be apparent to those skilled in the art. The various aspects and embodiments disclosed herein are provided for explanatory purposes and are not intended to be limiting, with the true scope being indicated by the following claims.

What is claimed is:

1. A computer-implemented method comprising:
   determining, by a computing device and based on segmentation data for an image, an object in the image;
   determining, by the computing device and based on a depth map for the image, depth information for the object;
   detecting, by a user interaction with a graphical user interface, an indication to insert a virtual object at a location in a vicinity of the object, wherein the user interaction is indicative of an approximate location in a two-dimensional (2D) coordinate system of the image;
   determining a location and a pose for the virtual object in a corresponding three-dimensional (3D) coordinate system, wherein the 3D coordinate system comprises the 2D coordinate system and the depth map; and
   inserting, by the computing device and based on the location and the pose, the virtual object at the location in the vicinity of the object.

2. The computer-implemented method of claim 1, further comprising:
   providing, by the graphical user interface, the virtual object by providing a menu comprising the virtual object among a plurality of selectable virtual objects.

3. The computer-implemented method of claim 1, wherein the user interaction comprises a user selection of the virtual object, wherein the user selection comprises a tapping of the virtual object, or a touching of the virtual object.

4. The computer-implemented method of claim 1, wherein the user interaction comprises a user selection of the location in the vicinity of the object.

5. The computer-implemented method of claim 1, wherein the user interaction comprises an indication to change an apparent depth of the virtual object in the image, and wherein the inserting of the virtual object comprises adjusting the apparent depth of the virtual object based on the depth map for the image.

6. The computer-implemented method of claim 1, wherein the user interaction comprises an indication to partially occlude the virtual object by the object, and wherein the inserting of the virtual object comprises partially occluding the virtual object by the object based on the depth information for the object.

7. The computer-implemented method of claim 1, wherein the inserting of the virtual object comprises one or more of a resizing the virtual object, or masking a portion of the virtual object.

8. The computer-implemented method of claim 1, further comprising:
 detecting, by the graphical user interface, a movement or a rotation of the virtual object, and wherein the inserting of the virtual object comprises applying the movement or the rotation to the virtual object.

9. The computer-implemented method of claim 1, further comprising:
 detecting, by the graphical user interface, a change in a virtual pose of the virtual object; and
 applying the detected change in the virtual pose to the virtual object.

10. The computer-implemented method of claim 1, further comprising:
 identifying, based on the segmentation data, a portion of the image for insertion of the virtual object;
 providing, by the graphical user interface and based on the depth information, a recommendation to insert the virtual object at the identified portion of the image, and
 wherein the user interaction is responsive to the providing of the recommendation.

11. The computer-implemented method of claim 1, wherein the virtual object is associated with metadata indicating one or more real-world properties of the virtual object, and wherein the inserting of the virtual object comprises applying the one or more real-world properties of the virtual object in relation to the object.

12. The computer-implemented method of claim 11, wherein the one or more real-world properties comprise a size, a shape, or a pose.

13. The computer-implemented method of claim 1, wherein the inserting of the virtual object comprises utilizing a first depth information for the object and a second depth information for at least one portion of the image in the vicinity of the object.

14. The computer-implemented method of claim 1, further comprising:
 based at least in part on the segmentation data, identifying at least one background area for the image;
 determining, based on the depth map, second depth information for the at least one background area; and
 using the second depth information for the at least one background area to apply a depth-variable blurring process to the at least one background area.

15. The computer-implemented method of claim 1, further comprising:
 determining, based on the segmentation data for the image, a second object in the image;
 displaying, by the graphical user interface, a user-selectable segmentation mask of the second object;
 detecting, by the graphical user interface, a user selection of the user-selectable segmentation mask;
 receiving, via the graphical user interface, a second user indication to remove the second object from the image; and
 responsive to the second user indication, applying an object removal process to the second object to remove the second object from the image.

16. The computer-implemented method of claim 15, wherein the inserting of the virtual object comprises inserting the virtual object to replace the removed second object.

17. The computer-implemented method of claim 1, further comprising:
 receiving, by the computing device, a second image, wherein the image and the second image form a stereo pair and each include a plurality of pixels; and
 determining the depth map by determining a final disparity estimate for each pixel of the second image based on a disparity value estimate of each image tile of the second image, and
 wherein the determining of the final disparity estimate comprises recursively determining, from a first image tile of a smaller pixel size to a second image tile of a larger pixel size, matching costs of a disparity hypothesis for each of the plurality of pixels in the second image.

18. The computer-implemented method of claim 1, wherein the image is captured by an image capturing component of the computing device.

19. A computing device, comprising:
 one or more processors; and
 data storage, wherein the data storage has stored thereon computer-executable instructions that, when executed by the one or more processors, cause the computing device to carry out functions comprising:
  determining, by the computing device and based on segmentation data for an image, an object in the image;
  determining, by the computing device and based on a depth map for the image, depth information for the object;
  detecting, by a user interaction with a graphical user interface, an indication to insert a virtual object at a location in a vicinity of the object, wherein the user interaction is indicative of an approximate location in a two-dimensional (2D) coordinate system of the image;
  determining a location and a pose for the virtual object in a corresponding three-dimensional (3D) coordinate system, wherein the 3D coordinate system comprises the 2D coordinate system and the depth map; and
  inserting, by the computing device and based on the location and the pose, the virtual object at the location in the vicinity of the object.

20. A non-transitory computer readable medium having program instructions stored thereon that are executable by a processor to perform functions comprising:
 determining, by the computing device and based on segmentation data for an image, an object in the image;
 determining, by the computing device and based on a depth map for the image, depth information for the object;
 detecting, by a user interaction with a graphical user interface, an indication to insert a virtual object at a location in a vicinity of the object, wherein the user interaction is indicative of an approximate location in a two-dimensional (2D) coordinate system of the image;
 determining a location and a pose for the virtual object in a corresponding three-dimensional (3D) coordinate system, wherein the 3D coordinate system comprises the 2D coordinate system and the depth map; and
 inserting, by the computing device and based on the location and the pose, the virtual object at the location in the vicinity of the object.

* * * * *